(12) United States Patent
Kitchen (10) Patent No.: US 9,871,879 B2
(45) Date of Patent: *Jan. 16, 2018

(54) METHODS AND APPARATUSES FOR PROVIDING A DESIRED PORTION OF A DATA OBJECT DOCUMENT

(71) Applicant: CLOUDFLARE, INC., San Francisco, CA (US)

(72) Inventor: David Alexander Kitchen, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,082

(22) Filed: Jan. 6, 2017

(65) Prior Publication Data
US 2017/0118299 A1    Apr. 27, 2017

Related U.S. Application Data

(63) Continuation of application No. 14/859,116, filed on Sep. 18, 2015, now Pat. No. 9,578,087.

(51) Int. Cl.
*H04L 29/08*    (2006.01)
*H04L 29/06*    (2006.01)

(52) U.S. Cl.
CPC ......... *H04L 67/2828* (2013.01); *H04L 67/06* (2013.01); *H04L 67/42* (2013.01)

(58) Field of Classification Search
None
See application file for complete search history.

(56) References Cited

U.S. PATENT DOCUMENTS

| 7,849,502 | B1 * | 12/2010 | Bloch | H04L 12/2602 726/11 |
| 9,578,087 | B1 * | 2/2017 | Kitchen | H04L 67/06 |
| 2013/0152047 | A1 * | 6/2013 | Moorthi | G06F 11/368 717/124 |

OTHER PUBLICATIONS

Bray, The JavaScript Object Notation (JSON) Data Interchange Format, Internet Engineering Task Force (IETF), Request for Comments: 7159, Category: Standards Track, Mar. 2014, 16 pages.
JSONPath—XPath for JSON, Feb. 21, 2007, 5 pages, downloaded Sep. 18, 2015 at http://goessner.net/articles/JsonPath/.

(Continued)

*Primary Examiner* — Jeffrey R Swearingen
(74) *Attorney, Agent, or Firm* — Nicholson De Vos Webster & Elliott LLP (57) ABSTRACT

A method for providing a desired portion of a data object document is disclosed. The method comprises receiving, from a client device, an Application Program Interface (API) request for a data object document, where the API request includes a parameter identifying the desired portion of the data object document, and the desired portion is less than all of the data object document. The method continues with transmitting the API request for the data object document to an origin server, and receiving an API response from the origin server that includes the data object document including more than the desired portion of the data object document. The method further includes automatically selecting, from the received data object document, the desired portion of the data object document based on the parameter, and transmitting, to the client device, the desired portion instead of all of the data object document.

18 Claims, 5 Drawing Sheets

(56) References Cited

OTHER PUBLICATIONS

Non-Final Office Action for U.S. Appl. No. 14/859,116, dated Feb. 4, 2016, 7 pages.
Final Office Action for U.S. Appl. No. 14/859,116, dated Jun. 9, 2016, 7 pages.
Notice of Allowance for U.S. Appl. No. 14/859,116, dated Nov. 4, 2016, 11 pages.

* cited by examiner

METHODS AND APPARATUSES FOR PROVIDING A DESIRED PORTION OF A DATA OBJECT DOCUMENT

CROSS-REFERENCE TO RELATED APPLICATIONS

This application is a continuation of application Ser. No. 14/859,116, filed Sep. 18, 2015, now issued as U.S. Pat. No. 9,578,087, issued Feb. 21, 2017 which is hereby incorporated by reference.

FIELD

Embodiments of the invention relate to the field of network services; and more specifically to providing a desired portion of a data object document such as a specified portion of a JSON document.

BACKGROUND

Data object documents are used to exchange data between devices in web services. For example, Extensible Markup Language (XML), and JavaScript Object Notation are languages and formats used to transmit data objects between client devices (e.g., client devices running web applications, browsers, etc.) and Internet servers. A majority of web application program interfaces (APIs) used to implement web applications return to the client devices data object documents that are quite large in size.

The communication of these large documents between Internet servers and the client devices that requested them can consume a significant amount of bandwidth. In addition, the size of the documents may affect the response time.

SUMMARY

Exemplary methods performed in a proxy server for providing a desired portion of a data object document are disclosed. The methods comprise receiving, from a client device, an Application Program Interface (API) request for a data object document. The API request includes a parameter identifying the desired portion of the data object document, and the desired portion is less than all of the data object document. The method further comprise transmitting the API request for the data object document to an origin server, and receiving an API response from the origin server that includes the data object document including more than the desired portion of the data object document. The method continues with automatically selecting, from the received data object document, the desired portion of the data object document based on the parameter, and transmitting, to the client device, the desired portion of the data object document instead of all of the data object document.

A proxy server to provide a desired portion of data object documents is disclosed. The proxy server comprises a non-transitory computer readable medium to store instructions; and a processor coupled with the non-transitory computer readable medium to process the stored instructions to receive, from a client device, an application program interface (API) request for a data object document, wherein the API request includes a parameter identifying the desired portion of the data object document, and the desired portion is less than all of the data object document; to transmit the API request for the data object document to an origin server; to receive an API response from the origin server that includes the data object document including more than the desired portion of the data object document; to automatically select, from the received data object document, the desired portion of the data object document based on the parameter; and to transmit, to the client device, the desired portion of the data object document instead of all of the data object document.

A non-transitory computer readable storage medium that provide instructions is disclosed. The instructions, when executed by a processor of a proxy server, cause said processor to perform operations comprising receiving, from a client device, an application program interface (API) request for a data object document, wherein the API request includes a parameter identifying a desired portion of the data object document, and the desired portion is less than all of the data object document. The operations further comprise transmitting the API request for the data object document to an origin server, and receiving an API response from the origin server that includes the data object document including more than the desired portion of the data object document. The operations further comprise automatically selecting, from the received data object document, the desired portion of the data object document based on the parameter; and transmitting, to the client device, the desired portion of the data object document instead of all of the data object document.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Data object documents are used to exchange data between devices in web services. For example, Extensible Markup Language (XML), and JavaScript Object Notation are languages and formats used to transmit data objects between client devices (e.g., client devices running web applications, browsers, etc.) and Internet servers. A majority of web application program interfaces (APIs) used to implement web applications return to the client devices data object documents that are quite large in size.

The communication of these large documents between Internet servers and the client devices that request them consumes a significant amount of bandwidth. In addition, the size of the documents may affect the response time. Conventional web applications (and more generally web APIs) enabling communication of data object documents between internet servers and client devices do not support a way to declare a portion of the object document to be returned. Thus, conventional web applications do not return portions of data object documents to a client device.

Methods and apparatuses for providing data object document filtering as part of Internet-based proxy services (hereinafter "service") is described. The service, which is available over the Internet and does not require customers (e.g., owners of a domain and/or personnel working on behalf of domain owner to install hardware or software, allows customers (e.g., owners of a domain)) to provide portion of data object documents to client devices while ensuring a fast, bandwidth efficient, and robust performance response to the client devices. Unlike other products that require installation of hardware or software, the service (in particular the filtering of data object document) described herein exists at the network level (and thus does not require customers to install hardware or software). In some embodiments, the service provides performance services for the customers. For example, the service can participate in a content delivery network (CDN) and dynamically cache customer's files closer to visitors. As used herein, a visitor is an entity causing an instance of a client network application (e.g., a web browser (or more generally a web application), an FTP (File Transfer Protocol) client, an SSH (Secure Shell) client, a Telnet client, etc.) implementing a network protocol to access content through a network (e.g., the Internet). The client network application (or as may be referred herein as "client application") may be implemented on one or more electronic devices, which is referred to as a "client device."

In some embodiments, customers register for the service by changing their authoritative name server to an authoritative name server of the service, and also changing the IP address(es) that resolve to their origin server(s) (which hosts content of their domain) to point to a proxy server of the service. In other embodiments, customers of the service change individual DNS records to point to a proxy server (or point to other domain(s) that point to a proxy server of the service). For example, the customers may change their DNS records to point to a CNAME that corresponds with a proxy server of the service. Regardless of the embodiment, requests from visitors for actions to be performed on identified resources of the customer's domain are received at the proxy server.

The proxy server analyzes the requests and performs one or more request related actions. For example in some embodiments, the proxy server receives, from a client device, a request for a data object document, which includes a parameter identifying a desired portion of the data object document. The desired portion is less than all of the data object document. The proxy server then transmits the request for the data object document to an origin server. The proxy server receives a response from the origin server that includes the data object document including more than the desired portion of the data object document; and automatically selects, from the received data object document, the desired portion of the data object document based on the parameter. The proxy server then transmits, to the client device, the desired portion of the data object document instead of all of the data object document.

Figure 1:
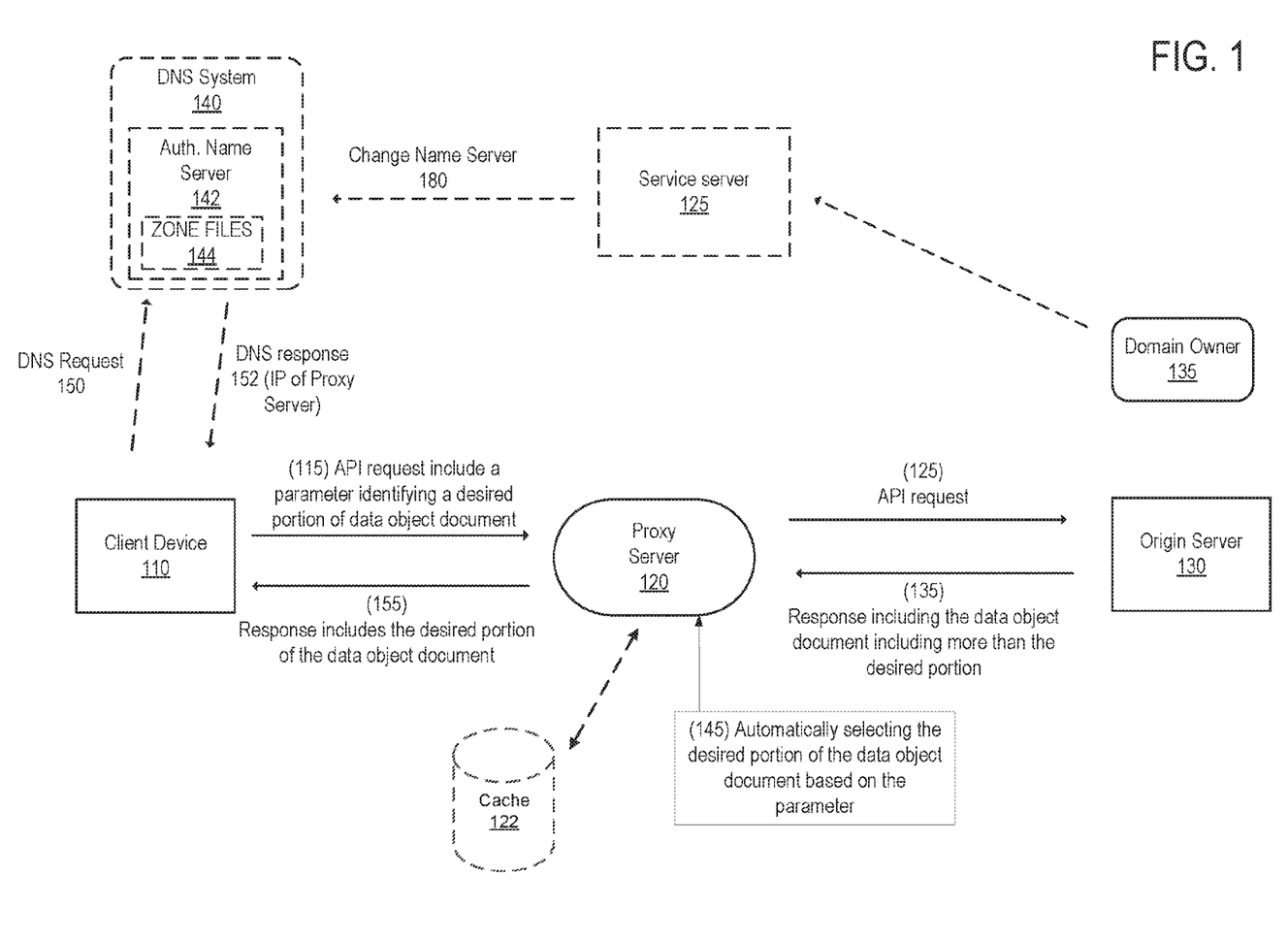
FIG. 1 illustrates an exemplary architecture of an Internet-based proxy service according to some embodiments of the invention.

FIG. 1 illustrates an exemplary architecture of the service according to one embodiment of the invention. The domain owner 135 is a customer of the service and registers their respective domain for the service. For example, the authoritative name servers for each domain of the domain owner 135 may be changed to the authoritative name server 142 of the service at operation 180. It should be understood that the backup authoritative name server serving the domain may also be changed to an authoritative name server of the service. The zone file record for the domain is also changed such that DNS resolution requests for the domain owned by the domain owner 135, which corresponds with the origin server 130, resolve to the proxy server 120. In one embodiment, a customer (e.g., the domain owners 135 or other entity (e.g., web administrators) on behalf of the domain owner 135) may use the service server 125 to change their authoritative name server to the authoritative name server 142 and change their zone file to have their domain point to the service proxy server (herein after "proxy server") 120.

The service server 125, operated by the service, provides a set of tools and interfaces for the domain owner 135 and is accessible over the Internet. For example, the service server 125, among other things, allows the domain owner 135 to register for the service, view statistics/logs of events, and report suspicious events. The service server 125 includes tools to assist the domain owner 135 in changing their authoritative name servers and zone file record. It should be understood, however, that the domain owner 135 may change their authoritative name server and zone file without use of the service server 125 (i.e., they may directly change the authoritative name server and zone file).

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin server 130. Accordingly, when the DNS system 140 resolves a request for a domain corresponding to the origin server 130, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

The client device 110 is a computing device (e.g., laptop, workstation, smartphone, palm top, mobile phone, tablets, gaming system, set-top box, etc.) that is capable of accessing network resources (e.g., they include software such as web applications (e.g., web browsers, mobile applications, etc.) that are capable of accessing network resources). In some embodiments, the web applications are implemented based on web application program interfaces (APIs) enabling the client device to request a portion of a data object document by transmitting a request for the data object document including a parameter identifying the desired portion of the data object document. A user at the client device 110 requests network resources (e.g., HTML pages, images, word processing documents, PDF files, movie files, music files, data object documents through a client network application such as a web application (e.g., web browser, mobile web application, etc.) or other application (e.g., FTP client, SSH client, Telnet client, etc.). The data object document may be a data structure including a plurality of attribute-value pairs. The data object document may have various formats, for example, the data object document may be of JavaScript Object Notation (JSON) format as described with respect to Request For Comment RFC 7159 "the JavaScript Object Notation (JSON) Data Interchange format", or Standard European Computer Manufacturers Association (ECM)-404: "The JSON Data Interchange Format," which are hereby incorporated by reference. In another example, the data object document is of Extensible Markup Language (XML) format. Although the present embodiments are described with exemplary language formats JSON, and XML, the embodiments are not so limited and are applicable to any other data-interchange format, which allows communications of data object documents between web applications.

The origin server 130 is a computing device that serves network resources (e.g., HTML pages, images, word processing documents, PDF files, movie files, music files, data object documents (e.g., JSON documents, XML documents) or other computer files). The origin server 130 responds to requests for network resources (e.g., from an HTTP request, FTP request, telnet request, etc.). Although not illustrated in FIG. 1, it should be understood that the network resources of the origin server 130 may be stored separately from the device that responds to the requests. In some embodiments, in contrast to the client device 130, the origin server 130 is not operative to receive a request for a data object document, where the request includes a parameter indicating a desired portion of the data object document. In some of these embodiments, the origin server 130 is only operative to transmit, in response to a request for a data object document, the entire document and is not operative to transmit a portion of that document.

The proxy server 120 is a computing device that is situated between the client device 110 and the origin server 130 and provides features of the service. Certain network traffic passes through the proxy server 120 (traffic sent from the client devices 110 and/or traffic sent from the origin server 130). Based at least in part on this traffic, the proxy server 120 provides a set of one or more services for the benefit of the customers and/or users of the client devices 110. For example, the proxy server 120 is operative to provide a desired portion of a data object document to the client device 110 in response to a request including a parameter identifying the desired portion of the data object document. In some embodiments, the proxy server 120 may also provide additional services such as participation in a content delivery network by providing cached files of the origin server 130 (e.g., through the cache 122); providing cached copies of files (if available) of the origin server 130 during periods when they are offline (e.g., through the cache 122); restricting access to the origin server 130 (which may be based on a set of one or more factors such as the characteristics of the requester, the type of request, and the content of the request); and scanning the traffic (sent from a client device 110 and/or sent from an origin server 130) for vulnerabilities (e.g., virus, worm, etc.) and acting accordingly (e.g., blocking the request, alerting the sender and/or receiver of the vulnerability, throttling the connection to slow down the request, etc.).).

While FIG. 1 illustrates a single proxy server 120, in some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

While FIG. 1 illustrates a single origin server 130 and a single client device 110 respectively coupled with the proxy server 120, in some embodiments the proxy server is coupled with multiple origin servers and/or with multiple client devices. Moreover, in some embodiments, there are multiple proxy servers providing service for a particular domain.

The owner of the proxy server 120 is typically different than the owner of the origin server 130. In addition, the proxy server 120 is not typically part of the local network of the origin server 130. For example, the proxy server 120 is outside of the local area network of the origin server 130 and is typically not physically accessible by the owner/administrator of the origin server 130.

In some embodiments, the client device 110 makes a request 115 for a data object document (e.g., an HTTP GET request, or other request), which is transmitted to the proxy server 120. In some embodiments, the request 115 is an API request and includes a parameter identifying a desired portion of the data object document. In some embodiments, the parameter is included in a header transmitted with the request (e.g., an HTTP header transmitted with the HTTP GET request). In other embodiments, the parameter is included as a parameter of the request 115 itself (e.g., a parameter of the HTTP GET request). The desired portion of the data object document is less than all of the data object document to be received. The proxy server 120 analyzes the request 115 and transmits the request 125 for the data object document to the origin server 130. In one embodiment, following the receipt of the request 115 including the parameter identifying a desired portion of the data object document, the proxy server 120 removes the parameter prior to transmitting the request 125 to the origin server. In these embodiments, the request 125 for data object document is transmitted to the origin server 130 without the parameter identifying the portion of the data object document. The parameter is stored at the proxy server 120. Alternatively, in other embodiments, the proxy server 120 transmits the request 125 to the origin server 130 including the parameter identifying the desired portion.

In some embodiments, the proxy server may determine whether the desired portion of the data object document is available in a cache (e.g., cache 122) prior to transmitting the request 125 to the origin server 130.

The proxy server 120 receives a response 135 from the origin server 130 in response to the request 125 for data object document. The response 135 includes the data object document that includes more than the desired portion of the data object document. In some embodiments, the data object document received in the response 135 includes a set of attribute-value pairs (e.g., objects) that includes more pairs than those requested by the client device 110. The desired portion of the data object document is a subset from the received set of attribute-value pairs, which is strictly less than the entire set of attribute-value pairs.

The proxy server 120 automatically selects the desired portion of the data object document at operation 145. The selection of the desired portion of the data object document is performed based on the parameter included in the request 115 received from the client device 110. The parameter is stored at the proxy server and retrieved when a response to the request 125 is received from the origin server 130. In some embodiments, the parameter defines one or more selection criteria for identifying the desired portion of the data object document. In some embodiments, when the data object document received from the origin server 130 includes a set of attribute-value pairs, the parameter is used to select a subset of these attribute-value pairs as the desired portion of the object data document. The proxy server parses the attribute-value pairs of the data object document and extracts the subset of pairs that satisfy the selection criteria defined by the parameter. The desired portion of the data object document is then transmitted to the client device, instead of the entire data object document.

Thus, one example of the response 155 transmitted to the client device 110, is a desired portion of a data object document received from the origin server 130. As discussed above, upon receipt of the data object document in the response 135, the proxy server selects the desired portion from the data object document (where the portion is less than all of the data object document) and transmits it in the response 155 to the client device instead of transmitting the entire data object document received from the origin server.

In cases where the proxy server 120 locally transmits the response 145 to the client device 110A (locally referring to transmitting the response 145 without the request being forwarded to the origin server 130), the response includes the desired portion of the data object document. Thus, if the proxy server 120 determines that the desired portion of the data object document (or the data object document) is available in the cache 122 (e.g., the data object document may have been stored in the cache 122 as a result of a previous request from the client device 110 (or from another, not illustrated, client device) for the data object document)) the proxy server 120 may retrieve this data object document (or the portion of the data object document) and automatically selects the desired portion based on the parameter to be transmitted to the client device 110 in the response 155.

Figure 2:
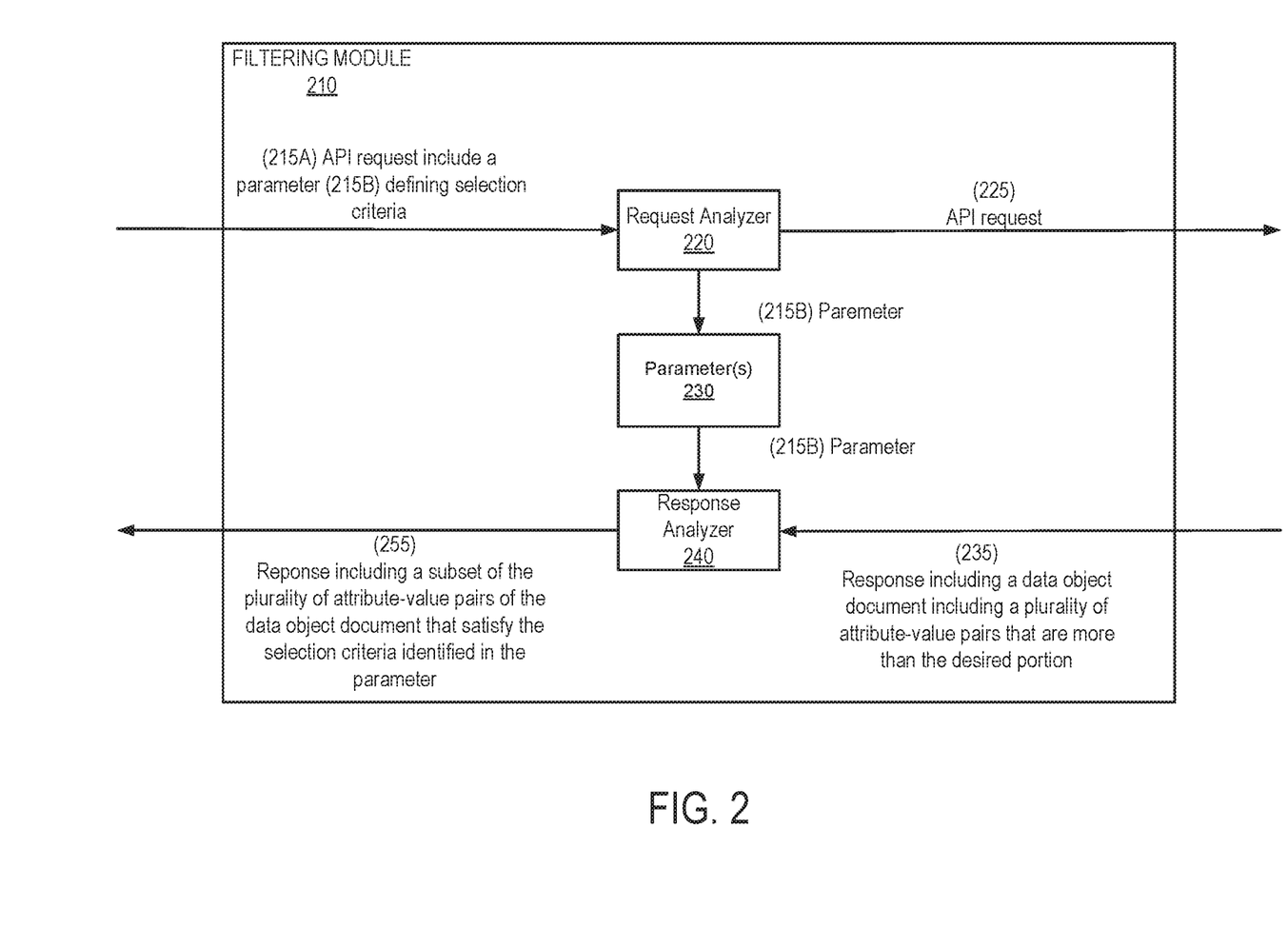
FIG. 2 is a block diagram illustrating an exemplary filtering module of the proxy server that processes requests and responses according to one embodiment of the invention.

FIG. 2 is a block diagram illustrating an exemplary filtering module 210 of the proxy server 120 that processes requests and responses according to one embodiment of the invention. The filtering module 210 includes the request analyzer 220, the parameter(s) 230, and the response analyzer 240. When a request 215A for a data object document is received at the proxy server 120 from the client device 110, the request analyzer 220 parses the request 215A. The request 215A includes a parameter 215B defining one or more selection criteria for identifying a desired portion of the requested data object document.

In some exemplary embodiments, the requested data object document is a JavaScript Object Notation (JSON) document. In this embodiment, the request 215A is an API request for a JSON document that includes a parameter 215B that specifies which part of the JSON document is requested, such as in a JSONPath expression defining selection criteria for identifying the desired portion of the JSON document. In one embodiment, the request is an HTTP request (e.g., HTTP GET) for a JSON document to be retrieved from the origin server 130. In some embodiments, the JSONPath expression is included in an HTTP header received with the HTTP request. In other embodiments, the JSONPath expression is included as a parameter of the HTTP GET request.

In another exemplary embodiment, the requested data object document is an Extensible Markup Language (XML) document. In this embodiment, the request 215A is an API request for an XML document that includes a parameter 215B that specifies which part of the XML document is requested, such as in an XML Path (XPath) expression defining selection criteria for identifying the desired portion of the XML document. In one embodiment, the request is an HTTP request (e.g., HTTP GET) for a XML document to be retrieved from the origin server 130. In some embodiments, the XPath expression is included in an HTTP header received with the HTTP request. In other embodiments, the XPath expression is included as a parameter of the HTTP GET request.

Upon receipt of the request 215A (including the parameter 215B), the request analyzer 220 transmits the request to the origin server on behalf of the client device 110. In some embodiments, prior to transmitting the request 215A, the proxy server may modify the request and remove from the request the parameter 215B defining the selection criteria identifying the portion of the data object document. In an exemplary embodiment, when the parameter is included in an HTTP header transmitted with the request, the header is removed and the HTTP request is transmitted to the origin server 130 without this header. In another exemplary embodiment, when the parameter 215B is included as a parameter of the HTTP GET request, the parameter is removed from the request prior to being transmitted to the origin server 130. In both exemplary embodiments, when the parameter 215B is removed from the request, the request 235 transmitted to the origin server 130 is for the entire data packet document instead of only for the desired portion of the data packet document. The parameter 215B is then stored at the parameters 230. In other embodiments, the proxy server does not modify the request 215A and it is transmitted to the origin server including the parameter 215B.

The response 235 (e.g., an HTTP response) may include the requested data object document, an error code indicating that the data object document cannot be found (e.g., an HTTP response status code 404 error), an error code indicating an problem with the origin server (e.g., an HTTP response status code 5XX error) or other response code.

In some embodiments, the proxy server 120 receives the response 235 including the requested data object document (e.g., JSON document, XML document) from the origin server 130. The received data object document is more than the desired portion of the data object document requested by the client device 110. In an exemplary embodiment, the data object document received from the origin server includes N attribute-value pairs, while the desired portion of the data object document requested by the client device 110 corresponds to a subset including M attribute-value pairs, where M<N.

The response analyzer 230 receives the response 235 including the data object document (e.g., JSON document, XML document) and automatically selects, based on the parameter 215B, the desired portion of the data object document to be transmitted to the client device 110. The responses analyzer 230 parses the data object document and extracts from the document the portion that satisfies the selection criteria defined by the parameter 215B. In the exemplary embodiments where the data object document received from the origin server includes N attribute value pairs, the response analyzer parses the pairs and extracts the M pairs that satisfy the selection criteria. The M pairs of attribute-values are then transmitted in the response 255 to the client device 110 instead of the entire N attribute-value pairs. The transmission of the portion of the data object document instead of the entire document results in the reduction of bandwidth consumption when transmitting data object documents (JSON documents, or XML documents) to the client device by sending only the desired portion of the data object documents to the client device.

The operations in the flow diagram of FIGS. 3 and 4 will be described with reference to the exemplary embodiments of the FIG. 1. However, it should be understood that the operations of the flow diagrams can be performed by embodiments of the invention other than those discussed with reference to the FIG. 1, and the embodiments of the invention discussed with reference to these other figures can perform operations different than those discussed with reference to the flow diagrams.

Figure 3:
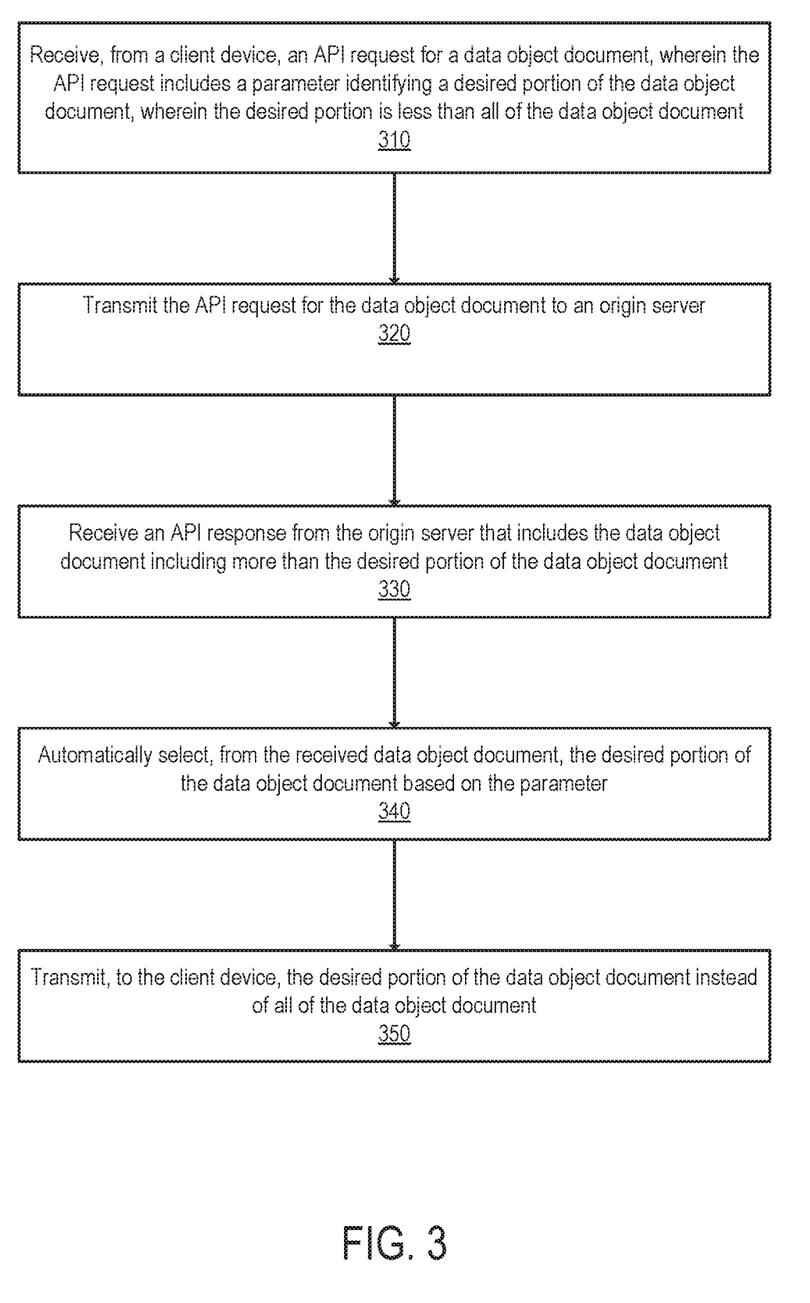
FIG. 3 is a flow diagram illustrating exemplary operations for providing a desired portion of a data object document according to some embodiments of the invention.
Figure 4:
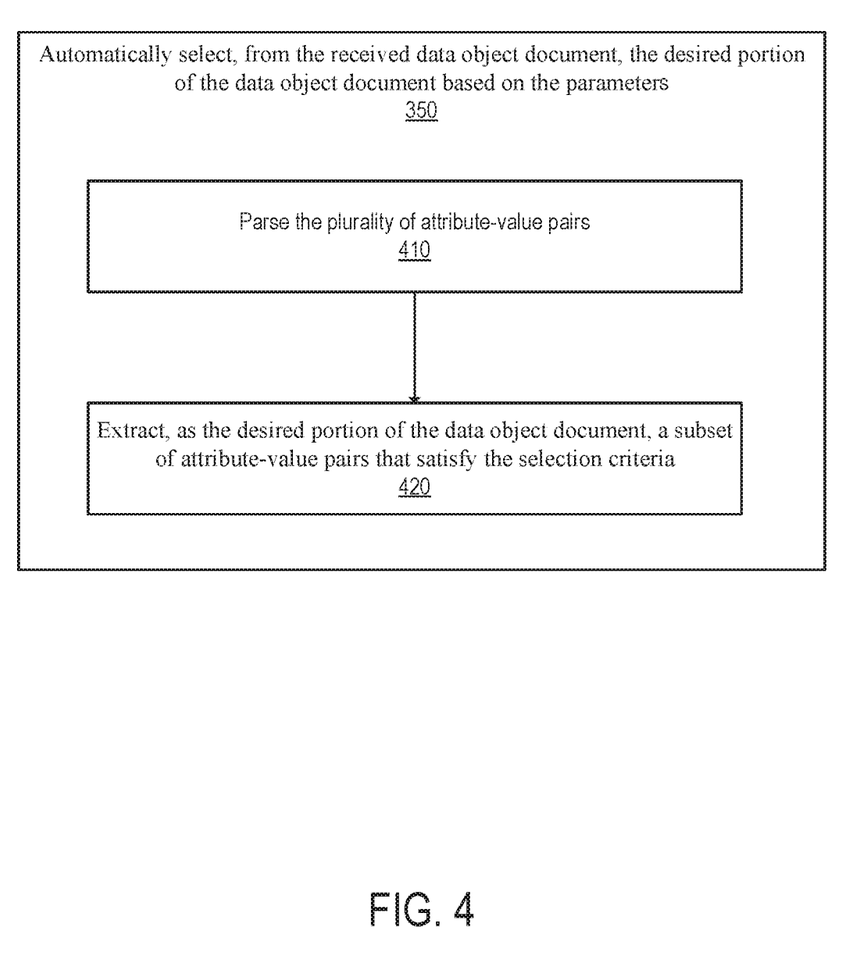
FIG. 4 is a flow diagram illustrating exemplary operations for automatically selecting a desired portion of a data object document according to some embodiments of the invention.

FIG. 3 is a flow diagram illustrating exemplary operations for providing a desired portion of a data object document according to some embodiments. At block 210, the proxy server 120 receives, from the client device 110, the request 115 for a data object document. The request 115 includes a parameter identifying a desired portion of the data object document, where the desired portion is less than all of the data object document. Flow moves from block 310 to block 320 where the proxy server 120 transmits the request 125 for the data object document to the origin server 130. The request may not include the parameter identifying the desired portion of the data object document. Flow then moves to block 330, at which the proxy server 120 receives a response 135 from the origin server 130 that includes the data object document including more than the desired portion of the data object document. For instance, the response may include the entire data object document. Flow moves from block 330 to 340, where the proxy server automatically selects, from the received data object document, the desired portion of the data object document based on the parameter included in the request 115. Flow then moves to block 350 where the proxy server transmits, to the client device 120, a response 155 that includes the desired portion of the data object document instead of all of the data object document.

In some embodiments, the received data object document received from the origin server 130 includes a set of multiple attribute-value pairs. FIG. 4 is a flow diagram illustrating exemplary operations for automatically selecting a desired portion of a data object document according to some embodiments of the invention. At block 410, the proxy server 120 parses the plurality of attribute-value pairs received in the data object document from the origin server. Flow then moves from block 410 to block 420, where the proxy server 120 extracts, as the desired portion of the data object document, a subset of attribute-value pairs that satisfy the one or more selection criteria. The subset of attribute-value pairs are transmitted to the client device in response to a request for the desired portion of data object document. The subset of attribute-value pairs is less than the entire set of attribute-value pairs received at the proxy server 120 from the origin server 130.

Thus, the embodiments presented herein disclose methods and apparatuses of a proxy server operative to filter data object documents (e.g., JSON document) such that only a portion of the data object document (e.g., a JSON response) received from the origin server, which satisfy the filter requirements, is transmitted to the client device.

Figure 5:
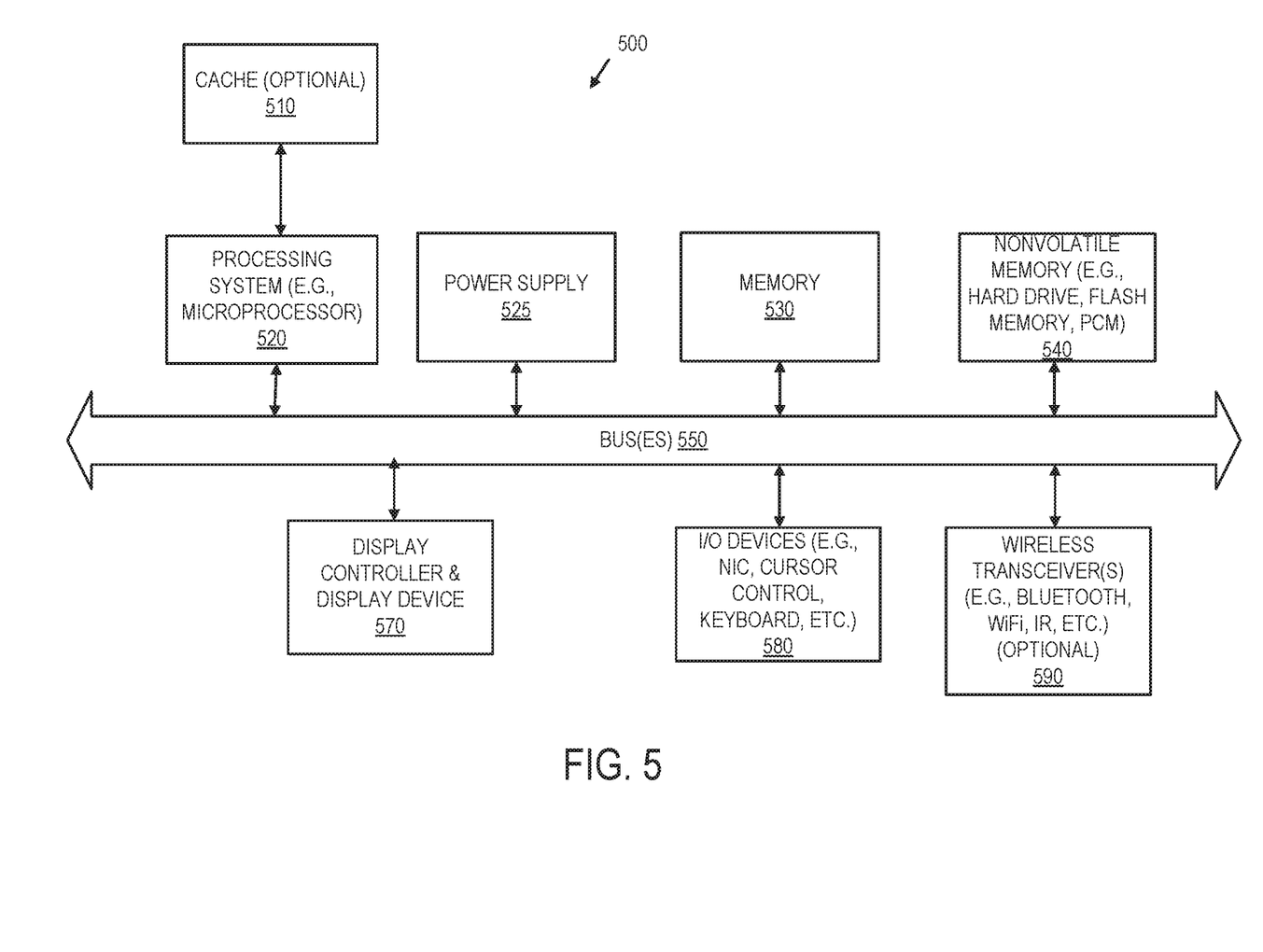
FIG. 5 is a block diagram illustrating an exemplary computer system according to some embodiments of the invention.

As illustrated in FIG. 5, the computer system 500, which is a form of a data processing system, includes the bus(es) 550 which is coupled with the processing system 520, power supply 525, memory 530, and the nonvolatile memory 540 (e.g., a hard drive, flash memory, Phase-Change Memory (PCM), etc.). The bus(es) 550 may be connected to each other through various bridges, controllers, and/or adapters as is well known in the art. The processing system 520 may retrieve instruction(s) from the memory 530 and/or the nonvolatile memory 540, and execute the instructions to perform operations described herein. The bus 550 interconnects the above components together and also interconnects those components to the display controller & display device 570, Input/Output devices 580 (e.g., NIC (Network Interface Card), a cursor control (e.g., mouse, touchscreen, touchpad, etc.), a keyboard, etc.), and the optional wireless transceiver(s) 590 (e.g., Bluetooth, WiFi, Infrared, etc.). In one embodiment, the client device 110, the service server 125, the proxy server 120, and/or the origin servers 130 can take the form of the computer system 500.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server for providing a desired portion of a data object document, the method comprising:
   receiving, from a client device, an Application Program Interface (API) request for a data object document, wherein the API request includes a parameter identifying the desired portion of the data object document, and the desired portion is less than all of the data object document;
   transmitting the API request for the data object document without the parameter identifying the desired portion of the data object document to an origin server that hosts the entire data object document;
   receiving an API response from the origin server that includes the data object document including more than the desired portion of the data object document;
   automatically selecting, from the received data object document, the desired portion of the data object document based on the parameter; and
   transmitting, to the client device, the desired portion of the data object document instead of all of the data object document.

2. The method of claim 1, wherein the received data object document included in the API response includes a plurality of attribute-value pairs in a human readable text format.

3. The method of claim 2, wherein the human readable text format is a Javascript Object Notation (JSON) format.

4. The method of claim 3, wherein the receiving the parameter includes receiving a JSONPath expression defining one or more selection criteria for identifying the desired portion of the data object document.

5. The method of claim 4, wherein automatically selecting includes:
   parsing the plurality of attribute-value pairs; and
   extracting, as the desired portion of the data object document, a subset of attribute-value pairs that satisfy the one or more selection criteria.

6. The method of claim 1, wherein the API request is received at the proxy server as a result of a DNS (Domain Name System) request for a domain resolving to the proxy server instead of the origin server.

7. A proxy server to provide a desired portion of data object documents, the proxy server comprising:
   a non-transitory computer readable medium to store instructions; and
   a processor coupled with the non-transitory computer readable medium to process the stored instructions to:
      receive, from a client device, an application program interface (API) request for a data object document, wherein the API request includes a parameter identifying the desired portion of the data object document, and the desired portion is less than all of the data object document,
      transmit the API request for the data object document without the parameter identifying the desired portion of the data object document to an origin server that hosts the entire data object document,
      receive an API response from the origin server that includes the data object document including more than the desired portion of the data object document,
      automatically select, from the received data object document, the desired portion of the data object document based on the parameter, and
      transmit, to the client device, the desired portion of the data object document instead of all of the data object document.

8. The proxy server of claim 7, wherein the received data object document included in the API response includes a plurality of attribute-value pairs in a human readable text format.

9. The proxy server of claim 8, wherein the human readable text format is a Javascript Object Notation (JSON) format.

10. The proxy server of claim 9, wherein to receive the parameter includes to receive a JSONPath expression defining one or more selection criteria for identifying the desired portion of the data object document.

11. The proxy server of claim 10, wherein to automatically select includes:
    to parse the plurality of attribute-value pairs; and
    to extract, as the desired portion of the data object document, a subset of attribute-value pairs that satisfy the one or more selection criteria.

12. The proxy server of claim 7, wherein the API request is received at the proxy server as a result of a DNS (Domain Name System) request for a domain resolving to the proxy server instead of the origin server.

13. A non-transitory computer readable storage medium that provide instructions, which when executed by a processor of a proxy server, cause said processor to perform operations comprising:
    receiving, from a client device, an application program interface (API) request for a data object document, wherein the API request includes a parameter identifying a desired portion of the data object document, and the desired portion is less than all of the data object document;
    transmitting the API request for the data object document without the parameter identifying the desired portion of the data object document to an origin server that hosts the entire data object document;
    receiving an API response from the origin server that includes the data object document including more than the desired portion of the data object document;
    automatically selecting, from the received data object document, the desired portion of the data object document based on the parameter; and
    transmitting, to the client device, the desired portion of the data object document instead of all of the data object document.

14. The non-transitory computer readable storage medium of claim 13, wherein the received data object document included in the API response includes a plurality of attribute-value pairs in a human readable text format.

15. The non-transitory computer readable storage medium of claim 14, wherein the human readable text format is a JavaScript Object Notation (JSON) format.

16. The non-transitory computer readable storage medium of claim 15, wherein the receiving the parameter includes receiving a JSONPath expression defining one or more selection criteria for identifying the desired portion of the data object document.

17. The non-transitory computer readable storage medium of claim 16, wherein the automatically selecting includes:
   parsing the plurality of attribute-value pairs; and
   extracting, as the desired portion of the data object document, a subset of attribute-value pairs that satisfy the one or more selection criteria.

18. The non-transitory computer readable storage medium of claim 13, wherein the API request is received at the proxy server as a result of a DNS (Domain Name System) request for a domain resolving to the proxy server instead of the origin server.

\* \* \* \* \*